Dec. 6, 1955
H. D. STUCK
2,725,795
JORDAN ENGINE PLUG
Original Filed Dec. 17, 1947
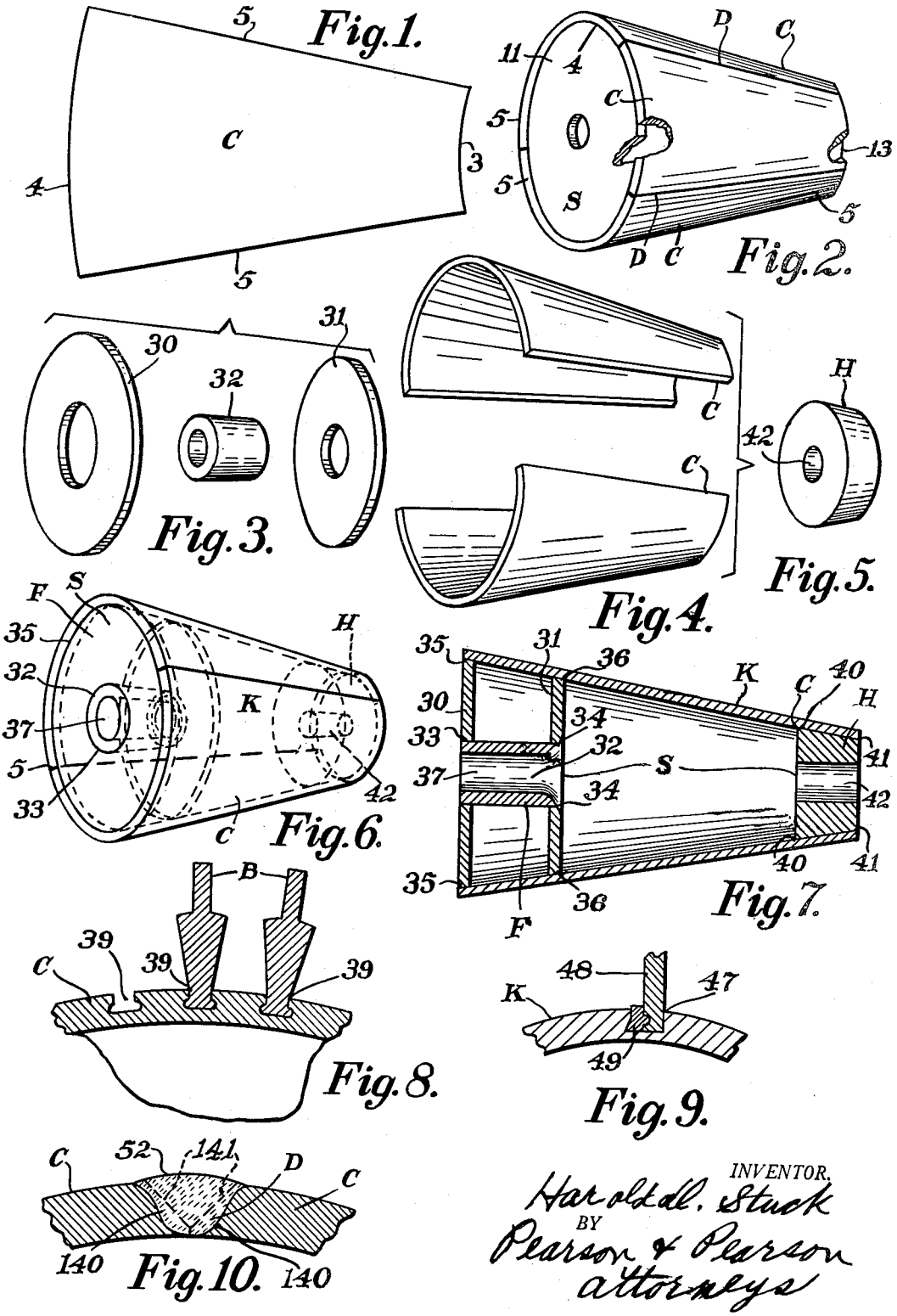
INVENTOR.
Harold D. Stuck
BY
Pearson & Pearson
attorneys

United States Patent Office 2,725,795
Patented Dec. 6, 1955

2,725,795
JORDAN ENGINE PLUG

Harold D. Stuck, Andover, Mass., assignor to John W. Bolton & Sons, Inc., Lawrence, Mass., a corporation of Massachusetts Original application December 17, 1947, Serial No. 792,289. Divided and this application July 15, 1952, Serial No. 298,951

6 Claims. (Cl. 92—27)

This application is a division of Serial No. 792,289 filed by me on December 17, 1947, and relates to Jordan Engine Plug Construction, U. S. Patent No. 2,610,554 issued September 16, 1952 to me.

Jordan plugs are of truncated conical form and heretofore have each been made of a hollow casting, supporting one or more annular bosses and bands, with slots to carry bars, or, sometimes, there is a skeleton body made up of annular spiders, and, sometimes, the bars are part of a complete casting. The truncated conical headed casting with no spiders or such supporting spiders alone constitute a supporting body for holding outwardly extending longitudinally extending cutting bars.

The purpose of this invention is to make a new type of very strong lightweight plug, in which the major parts of the castings forming the outside or the supporting body are replaced by a hollow truncated conical outside memebr or jacket of sheet metal which preferably has longitudinal grooves in which plug bars can be fixed and is supported on a fabricated body formed by a novel large hub and a small hub.

The outside member or jacket is preferably made of a plurality of truncated cone sections each of which is made of a high grade stainless steel or steel, bronze or other suitable metal which may be rolled or otherwise shaped, such outside cone sections extending around and forming the curved outside member of the plug. The sides or side edges of these sections are seam welded together and they, as parts of the outside member, are welded, as by plug welding, to the supporting body.

The fabricated supporting body is skeletonized and the large hub is formed of two annular discs of sheet metal joined by a separate sleeve or tube to form the large end of a plug as well as a small hub or tube to form the small end of the plug.

In the drawings, Fig. 1 is a plan view of a section of an outside member before being shaped.

Fig. 2 is an isometric view of three such sections shaped, attached together and to a supporting member, but not slotted.

Fig. 3 is an isometric view of the parts of a hub forming the large end of a supporting body for a new plug assembly.

Fig. 4 is a similar view showing two sections of an outside member and Fig. 5 is a similar view of a hub member for the small end.

Fig. 6 is an isometric view of an assembly of the parts shown in Figs. 3, 4, and 5 and Fig. 7 is a section on a longitudinal plane of the complete hub assembly shown in Fig. 6.

Fig. 8 is a view of adjoining parts of a supporting hub and an outside section member of a new plug assembly after the slots have been milled and with plug bars in place.

Fig. 9 is a diagrammatic sectional view of a slot and other parts which can be used in attaching bars to a type of plug such as shown in patent to Stuck, No. 2,366,367 of January 2, 1945.

Fig. 10 is a diagrammatic sectional view of a continuous seam weld.

In the drawings, C indicates a cone section of metal, preferably stainless steel, shaped as a part of a hollow truncated cone, which will be a new outside cone member K. Fig. 1 shows a flat blank for a section C before bending. Each section C has a large curved end 4 which, when bent, fits outside an arc of the large end 11 of the supporting body S and another small curved end 3 which when bent fits outside an arc of the small end 13 of the supporting body. Each section C has substantially straight side edges or sides 5, 5. This construction is shown generally in Figs. 1 and 2 where 4 indicates the large curved end and 3 the small curved end and 5 indicates the straight adjoining side edges which are welded together as at D, Fig. 2, preferably by seam welding as shown in Fig. 10.

On the construction of new plugs, which I will call fabricated plugs, I preferably use a new construction which is made by cutting out sections, C, C of rolled metal and shaping the sections. I use two hubs, namely a large hub F, Fig. 7, and a small hub H, which together form a supporting body S for an outside member or jacket K.

The large supporting hub F is made up of two disks 30 and 31 with a tubular connection 32, the two being welded together around the curved surface of tube 32 at 33, and 34, and to the cone sections C at 35 and 36. 37 is a shaft hole.

The supporting hub H at the small end is also a disk shaped member and can conveniently be a single tube which is turned down on the outside to form a truncated cone to the outside curved surface of which is welded the inside surface of the cone sections indicated by C at 40 and 41. 42 is a shaft hole.

I use tubes of steel, preferably centrifugally cast for the tubes 32 and H, cut them to the right length and turn them down.

In the construction shown in Fig. 2 there are three sections C but in Figs. 4 and 6, two sections are shown.

In every case however the cone sections C are welded and become a single outside member K and fit the inside supports F and H of supporting body S and they are welded thereto and together. When a hollow truncated conical outside member is complete and welded to a supporting body S, slots such as 39, Fig. 8 are milled in it so as to fit bars such as B, or slots 47 for bars 48 and keys 49 may be used as shown in Fig. 9.

It should be noted that as indicated in the drawings the discs 30, 31 and H each has flat diametrical faces whereby they can be easily formed from sheet metal. The outer peripheral edges or circumferential surfaces of discs 30 and 31, at 35 and 36 are each tapered to fit within and conform to the inside shape of the large end of jacket C and the circumferential surface of the disc, or tube H is also tapered to fit within, and conform to the inside shape of jacket C as shown between 40 and 41. The inner peripheral edges 33 and 34 of annular discs 30 and 31 are permanently attached to each opposite end of tube or sleeve 32 to form an integral unit.

The slots 39 are narrower or smaller at the outside than some part of the inside and the interior edges of the bars B are of the same size and shape as the slots shown in Fig. 8, both being straight in a lengthwise direction so that a single bar B or a compound bar 48 with key 47 Fig. 9 can be driven in lengthwise in a close drive fit at all points substantially the entire length of the outside curved member K of the plug.

Instead of using rolled stainless or other steel, I can use rolled manganese bronze, rolled monel or other weldable metal.

Fig. 10 is a lateral cross section of a continuous seam weld D between two sections C, C, 141, 141 representing the original side edges of each section and 52 the welding material which holds them together. The dotted lines 141, 141 represent the adjoining edges before seam welding and the curved full lines at 140, 140 after welding.

I claim:

1. The combination in a Jordan engine plug having a truncated conical hollow skin of sheet metal, of a skeletonized, skin-supporting body member, comprising a small hub at the small end of the plug formed of a separate metal disc having an axial shaft bore therethrough, a pair of oppositely disposed flat diametrical surfaces and a circumferential surface tapered to conform to the shape of, and permanently attached to the inside surface of the small end of said conical skin and a large hub at the large end of said plug formed of a pair of separate metal discs spaced apart by, and permanently attached to, a separate tubular sleeve, said sleeve having an axial shaft bore therethrough and said pair of discs each having flat diametrical surfaces and having circumferential surfaces tapered to conform to the shape of, and permanently attached to, the inside surface of the large end of said conical plug skin.

2. A combination as specified in claim 1 wherein each disc of said pair of discs is welded to the exterior surface of said sleeve and all of said discs are welded at their circumferential surfaces to the inside surface of said plug skin.

3. The combination in a Jordan plug having a truncated conical hollow skin of sheet metal of uniform thickness of a skeletonized body member for supporting said skin on a plug shaft, said member comprising a flat disc inseparably fixed inside the small end of said skin and having an axial bore for a plug shaft; a pair of spaced apart flat discs inseparably fixed inside the large end of said skin and each having an axial bore for a sleeve, and a sleeve inseparably fixed at each opposite end inside the axial bores of said pair of discs, said sleeve having an axial bore for a plug shaft whereby said skin and said skeletonized body member form a single bodily transportable, inseparable unit.

4. A combination as specified in claim 3 wherein said pair of discs and said sleeve are of uniform thickness substantially equal to the thickness of said skin but the flat disc at the small end of said skin is of a uniform thickness substantially greater than the thickness of said skin.

5. A fabricated supporting body for use in supporting a hollow, truncated conical Jordan plug jacket of sheet metal, said supporting body comprising a small hub formed of a separate metal disc having an axial shaft bore therethrough, a pair of oppositely disposed, flat, diametrical faces and a circumferential surface tapered to conform to the inside shape of the small end of a truncated conical jacket and a large hub, axially spaced from said small hub, said large hub being formed of a pair of separate, annular discs of sheet metal, spaced apart by, and permanently attached at their respective inner peripheral edges to an opposite end of a separate tubular sleeve, said tubular sleeve having an axial shaft bore therethrough and each said annular disc having a tapered outer peripheral edge which conforms to the inside shape of the large end of said truncated conical jacket.

6. A fabricated supporting body for use in supporting a hollow, truncated conical Jordan plug jacket, said supporting body comprising a large hub and a small hub each independent of the other, each having an axial shaft bore for a Jordan plug shaft, and each adapted to fit within and support an opposite end of a hollow truncated jacket, at least one said hub being formed by a pair of spaced apart annular sheet metal discs permanently attached at their respective inner peripheries to an opposite end of an elongated tubular sleeve.

References Cited in the file of this patent

UNITED STATES PATENTS

| Number | Name | Date |
|---|---|---|
| 243,568 | Jeffers | June 28, 1881 |
| 371,460 | Jeffers | Oct. 11, 1887 |
| 791,843 | Wagg | June 6, 1905 |
| 1,148,597 | Lewis | Aug. 3, 1915 |
| 1,313,628 | Ford | Aug. 19, 1919 |
| 1,410,546 | Battey | Mar. 28, 1922 |
| 1,614,784 | Finger | Jan. 18, 1927 |
| 1,829,630 | Bolton | Oct. 27, 1931 |
| 2,009,985 | Bray | July 30, 1935 |
| 2,103,344 | Stuck et al. | Dec. 28, 1937 |
| 2,165,947 | Stuck | July 11, 1939 |
| 2,201,001 | Stuck | May 14, 1940 |
| 2,282,750 | Schueler | May 12, 1942 |
| 2,309,376 | Avery | Jan. 26, 1943 |
| 2,366,367 | Stuck | Jan. 2, 1945 |
| 2,604,824 | Draper | July 29, 1952 |
| 2,610,554 | Stuck | Sept. 16, 1952 |